United States Patent
Reedy (10) Patent No.: US 10,711,737 B2
(45) Date of Patent: Jul. 14, 2020

(54) CONDUIT MOUNTING DEVICE

(71) Applicant: Honda Motor Co., Ltd., Tokyo (JP)

(72) Inventor: Christopher L. Reedy, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 15/675,203

(22) Filed: Aug. 11, 2017

(65) Prior Publication Data
US 2019/0048832 A1    Feb. 14, 2019

(51) Int. Cl.
| | |
|---|---|
| *F02M 25/08* | (2006.01) |
| *B62D 23/00* | (2006.01) |
| *B60K 15/035* | (2006.01) |
| *B62D 21/17* | (2006.01) |
| *F16L 41/08* | (2006.01) |
| *B62D 21/18* | (2006.01) |

(52) U.S. Cl.
CPC ... *F02M 25/0872* (2013.01); *B60K 15/03504* (2013.01); *B62D 21/17* (2013.01); *B62D 23/005* (2013.01); *F02M 25/089* (2013.01); *F02M 25/0854* (2013.01); *B60K 2015/03528* (2013.01); *B62D 21/183* (2013.01); *F16L 41/08* (2013.01)

(58) Field of Classification Search
CPC ........ F02M 25/08–14; F16L 3/00; F16L 3/02; F16L 3/04; F16L 15/00; F16L 19/00; F16L 31/00; F16L 33/00; F16L 33/22; F16L 33/30; F16L 41/00; F16L 41/02; F16L 41/021; F16L 41/04; F16L 41/08; F16L 41/086; F16L 41/14

USPC ......... 123/519–521; 180/312; 280/781, 782; 285/24, 27, 188, 189, 197, 199, 201, 285/205–208, 330, 414

See application file for complete search history.

(56) References Cited

U.S. PATENT DOCUMENTS

| | | | | |
|---|---|---|---|---|
| 1,689,575 | A | * 10/1928 | Winn | ............ F16L 41/086 285/18 |
| 2,316,974 | A | * 4/1943 | Risley | ............ F16L 41/06 285/199 |

(Continued)

FOREIGN PATENT DOCUMENTS

| | | |
|---|---|---|
| JP | S60151128 A | 8/1985 |
| JP | S60236834 A | 11/1985 |

(Continued)

*Primary Examiner* — Erick R Solis
*Assistant Examiner* — Robert A Werner
(74) *Attorney, Agent, or Firm* — Honda Patents & Technologies North America, LLC; Clifford B Vaterlaus (57) ABSTRACT

A device for mounting a conduit of a vapor canister on a vehicle includes a base having a first side and an opposing second side. The base includes fastener openings for receiving fasteners to attach the base to a frame. A connector extends from the first side of the base between the fastener openings for connecting the device to a conduit of a vapor canister. A pipe having an inlet extends from the second side of the base and forms an air passage from the inlet to the connector. The device may also include supports on the second side of the base for supporting the device on frame members with rounded or flat surfaces. The conduit mounting device can be installed by attaching the device on a frame member without the need for tools.

20 Claims, 9 Drawing Sheets

(56) References Cited

U.S. PATENT DOCUMENTS

| | | | |
|---|---|---|---|
| 2,631,346 A * | 3/1953 | Wengen | H01R 4/42 |
| | | | 439/791 |
| 2,800,912 A * | 7/1957 | McCamish | F16K 17/16 |
| | | | 137/68.23 |
| 3,103,352 A * | 9/1963 | Steffen | B23Q 1/48 |
| | | | 269/45 |
| 3,746,308 A * | 7/1973 | Vatterott | F16L 41/08 |
| | | | 251/145 |
| 4,727,955 A | 3/1988 | Honda et al. | |
| 4,901,970 A * | 2/1990 | Moss | A01K 97/10 |
| | | | 224/282 |
| 5,105,844 A * | 4/1992 | King, Sr. | F16L 47/345 |
| | | | 137/15.14 |
| 5,224,455 A * | 7/1993 | Ogasawara | B60K 15/03504 |
| | | | 123/519 |
| 5,228,727 A * | 7/1993 | Tokutake | F16L 41/084 |
| | | | 165/178 |
| 6,824,436 B2 | 11/2004 | Matsuda | |
| 7,143,751 B2 | 12/2006 | Sung | |
| 7,168,466 B2 | 1/2007 | Ganachaud et al. | |
| 7,350,511 B1 * | 4/2008 | Roche | A01D 34/82 |
| | | | 123/516 |
| 7,810,842 B2 * | 10/2010 | Ichikawa | F02M 25/089 |
| | | | 280/782 |
| 9,022,008 B2 * | 5/2015 | Hirukawa | B62J 35/00 |
| | | | 123/520 |
| 2012/0111651 A1 * | 5/2012 | Irie | B62K 11/04 |
| | | | 180/65.1 |
| 2014/0202783 A1 | 7/2014 | Shomura et al. | |
| 2015/0101577 A1 | 4/2015 | Balsdon et al. | |
| 2018/0179991 A1 * | 6/2018 | Oakden-Graus | F02M 25/089 |
| 2018/0312209 A1 * | 11/2018 | Plazotta | B62J 35/00 |

FOREIGN PATENT DOCUMENTS

| | | |
|---|---|---|
| JP | 2001263176 A | 9/2001 |
| JP | 4759013 B2 | 8/2011 |
| JP | 4935456 B2 | 5/2012 |

\* cited by examiner

CONDUIT MOUNTING DEVICE

BACKGROUND

The disclosed subject matter relates to mounting devices. More particularly, the disclosed subject matter relates to devices for mounting conduits on vehicles.

Conventionally it is known that vehicles powered by internal combustion engines have a fuel tank for storing fuel. Vaporized fuel may accumulate in the fuel tank and may sometimes leak into the surrounding environment. Such loss of vaporized fuel may lead to unwanted environmental effects and may reduce fuel efficiency.

In order to reduce the undesirable effects of such evaporative emissions, control equipment is sometimes applied to vehicles. Evaporative emission control equipment may include canisters having an absorbent material, such as active carbon, to remove the vaporized fuel from the fuel tank. The fuel may then be returned to the engine for combustion during operation of the engine.

Automobiles sometimes have carbon canisters mounted to the vehicle body using rigid mounting devices. Such arrangements are suitable for automobiles that usually travel on paved roads without excessive jarring or vibrations. However, off-road vehicles may add demands in mounting carbon canisters that are not encountered with typical automobiles. For example, off-road vehicles are often subjected to larger vibrations caused by driving on rough surfaces. Such vibrations may adversely affect the utility or wear of the carbon canisters. Moreover, off-road vehicles are often subjected to harsh conditions, including muddy, wet, or dirty conditions that may adversely affect the carbon canisters if not properly protected. Also, the carbon canisters may be damaged if deleterious material is allowed to be ingested into the intake of the carbon canister.

It would therefore be desirable to provide a device for mounting conduits of evaporative emissions control equipment that allows for intake air to be withdrawn from a location that prevents ingestion of water or dirt, such as an interior of a frame member. It would also be desirable to provide a device for mounting conduits of evaporative emissions control equipment in off-road vehicles that can be mounted easily to frames having different configurations. Additionally, it would be desirable to provide a canister mounting arrangement that helps to reduce the vibrations experienced by the canister, and that allows the canister to be protected from harsh environmental conditions.

SUMMARY

In accordance with one embodiment of the present disclosure, a conduit mounting device is provided. The conduit mounting device may include a base having a first side and an opposing second side. The base includes a pair of fastener openings for receiving fasteners to attach the base to a frame. A connector extends from the first side of the base between the pair of fastener openings for connecting to a conduit. A pipe extends from the second side of the base. The pipe has an inlet and forms a passage from the connector to the inlet.

In accordance with another embodiment of the present disclosure, a conduit mounting device comprises a base having a first side and an opposing second side. The base includes at least one fastener opening for receiving a fastener to attach the base to a frame. A connector extends from the first side of the base for connecting to a conduit. A pipe extends from the second side of the base, the pipe having an inlet. A plurality of supports project from the second side of the base, the supports being spaced apart to receive a frame member having a rounded surface. The supports further define a planar surface for contacting a frame member having a corresponding planar surface.

In accordance with yet a further embodiment of the present disclosure, a conduit mounting device is disclosed mounting a conduit of a vapor canister on a vehicle. The vehicle has a frame comprised of a plurality of tubular members supporting an engine and a seat. The conduit mounting device includes a base having a first side and an opposing second side. A connector extends from the first side of the base and connects to the conduit. A pipe having an inlet extends from the second side of the base. The pipe extends into one of the plurality of tubular frame members. A fastener fastens the device to the one of the plurality of tubular frame members.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-10, wherein like numbers indicate the same or corresponding elements throughout the views.

Figure 1:
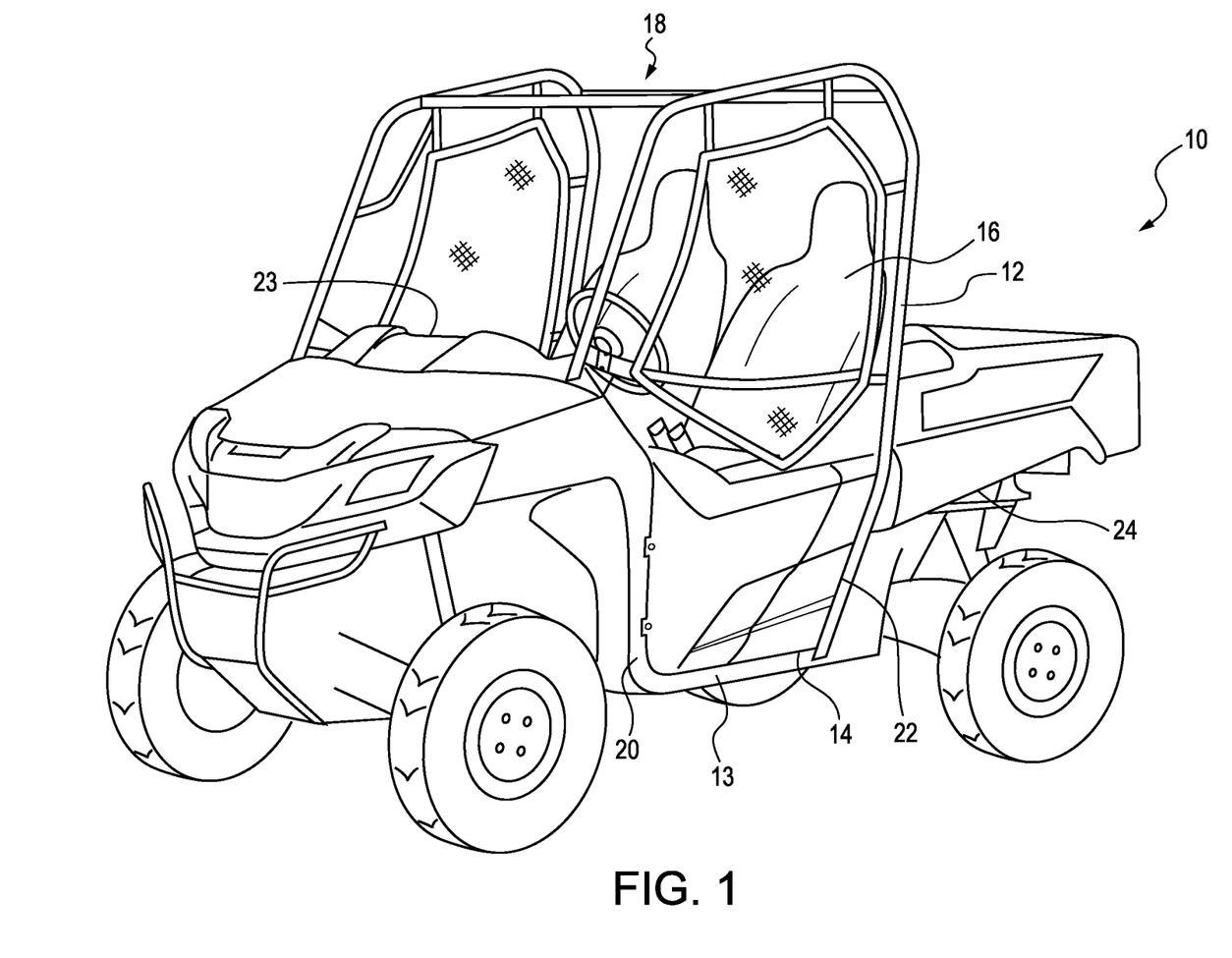
FIG. 1 is a front perspective view depicting a vehicle in accordance with one embodiment of the present disclosure.

FIG. 1 illustrates a perspective view of a vehicle, indicated generally at 10, in accordance with one embodiment of the present disclosure. The vehicle 10 is shown as an off-road vehicle. However, vehicles in accordance with alternative embodiments can comprise any variety of vehicles, including automobiles, trucks, vans, recreational vehicles, motorcycles, utility vehicles, agricultural equipment, or construction equipment, for example.

Figure 2:
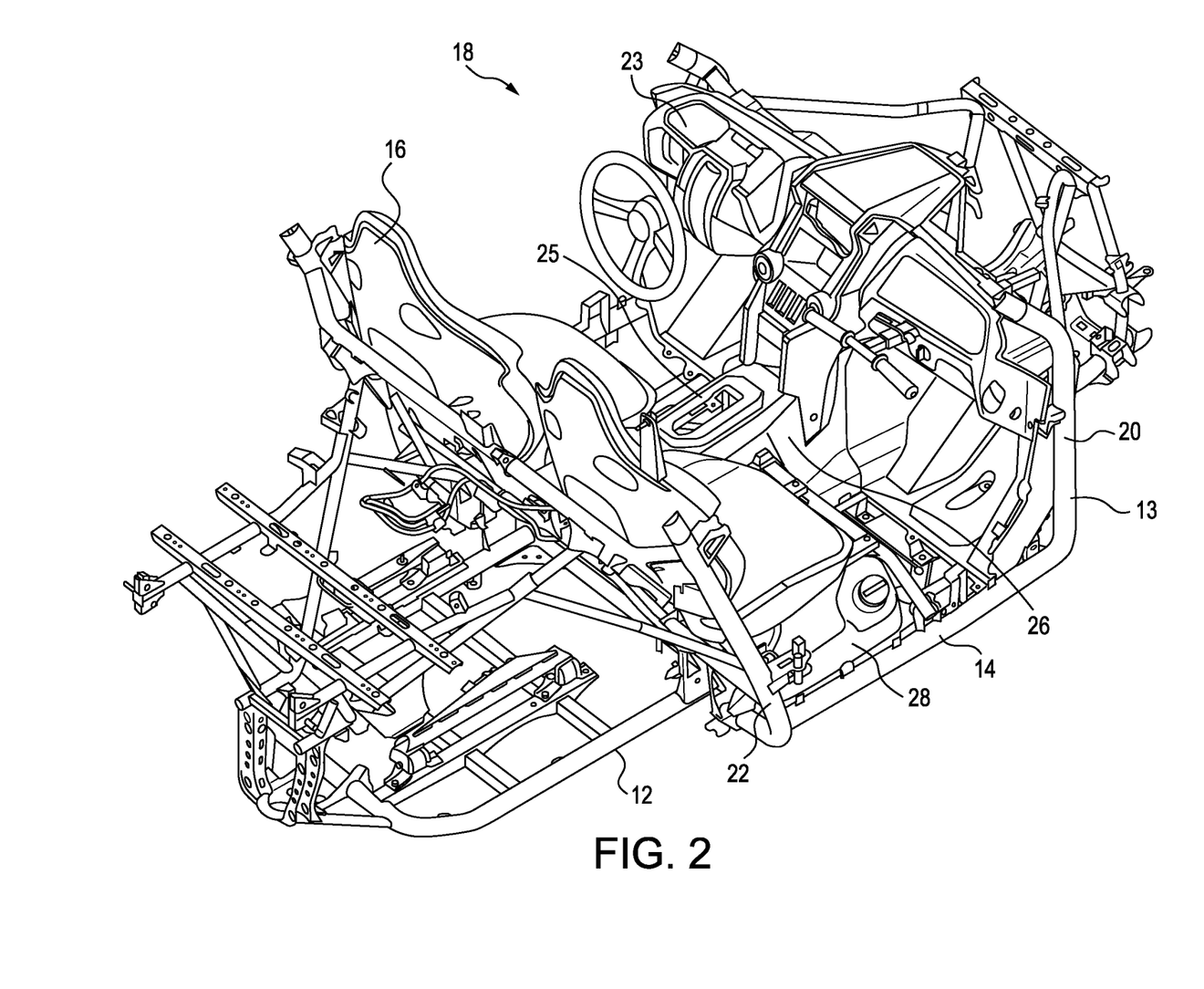
FIG. 2 is a top perspective view of a portion of a vehicle including a dashboard and console in accordance with the concepts of the present disclosure.
Figure 3:
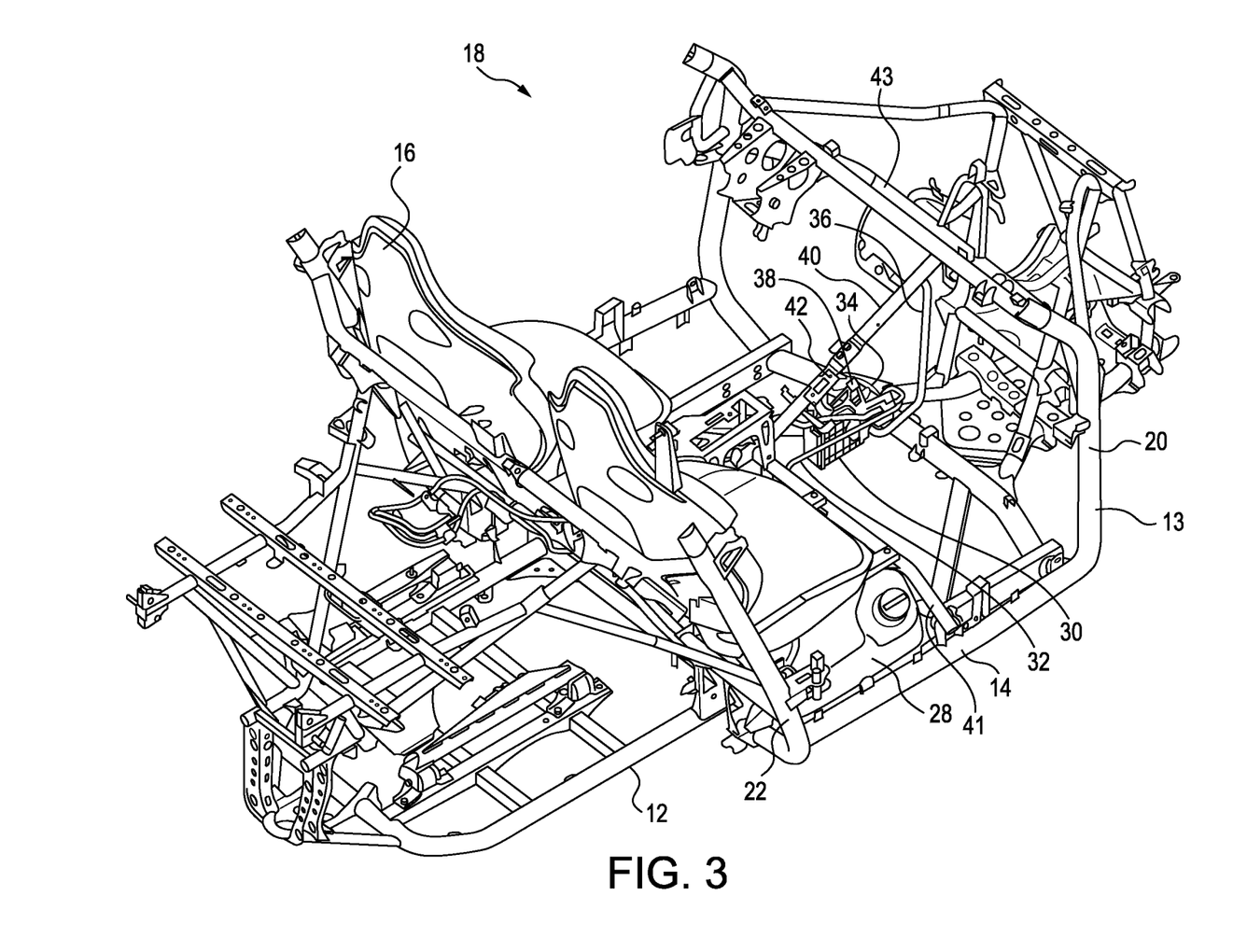
FIG. 3 is a top perspective view of the portion of the vehicle of FIG. 2 with the dashboard and console cover removed.
Figure 4:
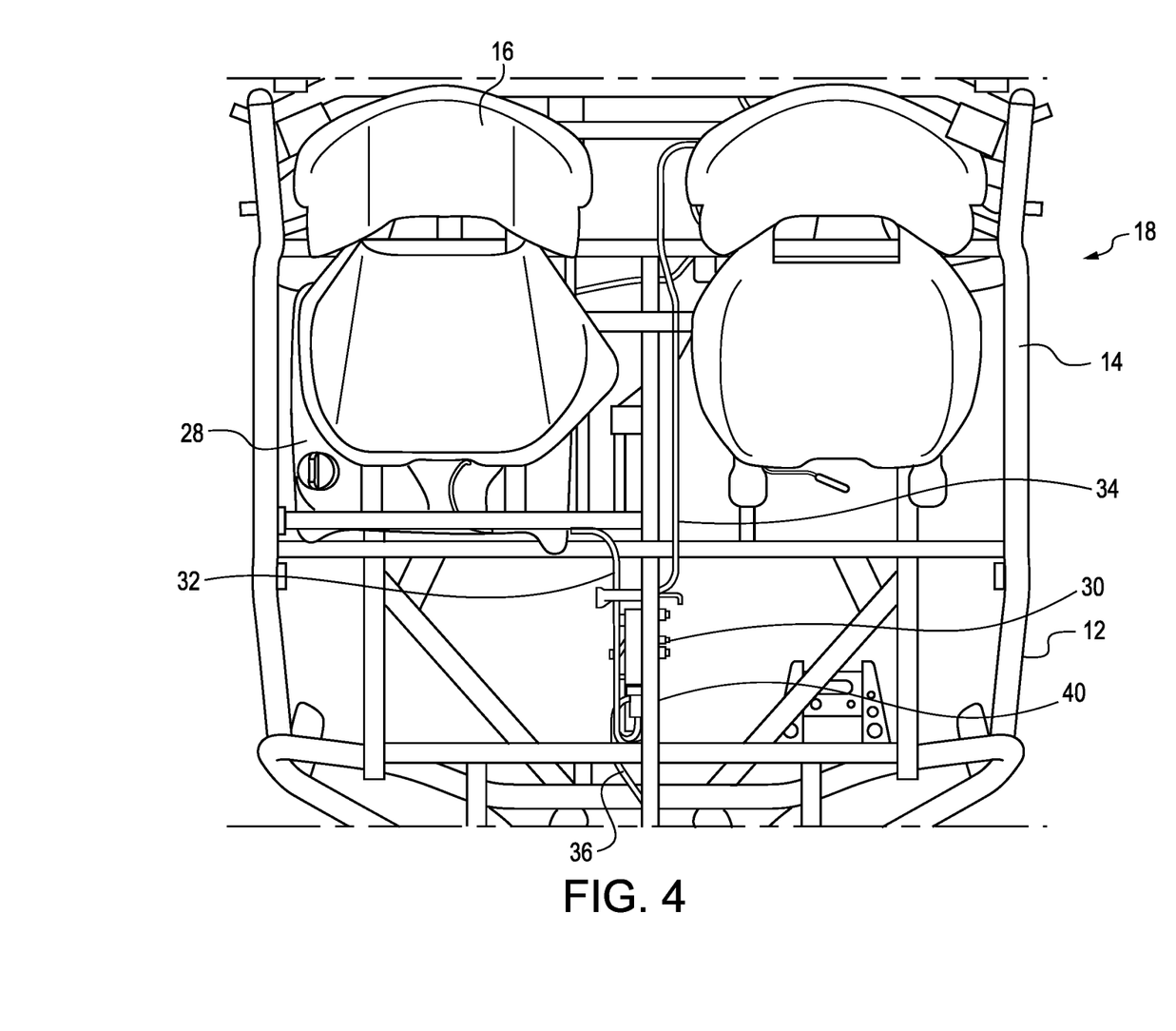
FIG. 4 is a top view of a portion of a vehicle in accordance with the concepts of the present disclosure.

The vehicle 10 may include a vehicle frame 12, also shown for clarity in FIGS. 2-3, comprised of a plurality of frame members 13. The frame members 13 may be tubular and may be connected together by welding or fasteners, for example. The vehicle frame 12 may include a plurality of base members 14 for supporting at least one seat 16 in an occupant area, indicated generally at 18. The frame 12 may include a pair of front upright members 20 extending in an upward direction with respect to the base members 14 and positioned at a forward portion of the occupant area 18. The frame 12 may also include a pair of rear upright members 22 extending in an upward direction with respect to the base members 14 and positioned at a rearward portion of the occupant area 18. The front upright members 20 and the rear upright members 22 may form part of a roll protection structure that is particularly suitable for use in off-road vehicles. It will also be understood that in one embodiment, the base members 14, the front upright members 20, and the rear upright members 22 may form part of the plurality of tubular frame members 13 of the frame 12.

It will be appreciated that the seats 16 may be arranged in any manner, and may include bench seats or bucket seats to provide seating surfaces for occupants of the vehicle 10. The seats 16 may be arranged in a side-by-side configuration, and may be arranged in a single row or multiple rows within the scope of the present disclosure.

The vehicle 10 includes an engine 24, such as an internal combustion engine, of any suitable size and configuration for providing a motive power to the vehicle 10. In one embodiment, the engine 24 may be supported by the vehicle frame 12 at a location behind the seats 16. However, in alternative embodiments, the engine 24 may be located in a central or front portion of the vehicle 10.

Referring to FIG. 2, which depicts a top perspective view of a portion of a vehicle 10, a dashboard 23 may be located at a forward portion of the occupant area 18. The dashboard 23 may include various controls, meters, and/or storage compartments suitable for assisting in operation of the vehicle 10 in a manner known to those skilled in the art. Similarly, a console 25 may be located in the occupant area 18. The console 25 may include a cover 26 for enclosing an interior space and may extend from a location between the seats 16 toward the dashboard 23.

The vehicle 10 may include a fuel tank 28 for carrying fuel to be used in the engine 24. In one embodiment, the fuel tank 28 may be located below one of the seats 16, such as below the passenger seat. However, it will be understood that in alternative embodiments, the fuel tank 28 may be located under the driver's seat or in front of or behind the seats 16.

As shown in FIG. 3, which depicts a top perspective view of the vehicle 10 with the dashboard 23 and console cover 26 removed, the vehicle 10 may include evaporative emission control equipment including a canister 30 positioned in the console 25 under the console cover 26. A tubular frame member 40 may be sloped upwardly in a rear to front direction, and the canister 30 may be attached to the tubular frame member 40 with a bracket 42. The canister 30 may contain a material, such as activated carbon, that absorbs fuel vapors. The evaporative emission control equipment may include a first conduit 32 extending from the fuel tank 28 to the canister 30, a second conduit 34 (shown most clearly in FIG. 4) extending from the canister 30 to the engine 24 (shown in FIG. 1), and an air intake conduit 36 for providing air to the canister 30. The evaporative emission control equipment may also include a purge valve 38 (shown most clearly in FIGS. 5-7) that can be activated as desired by an electronic control unit (ECU, not shown) to allow the fuel in the canister 30 to be purged.

In use, fuel vapors in the fuel tank 28 pass through the first conduit 32 to the canister 30 where the carbon absorbs the fuel. At an appropriate time, the ECU sends a signal to the purge valve 38 to open. The engine 24 creates a vacuum such that air is drawn into the canister 30 through the air intake conduit 36 to purge the fuel from the canister 30 and direct the fuel through the second conduit 34 to the engine 24 to be combusted.

The canister 30 may be positioned in a location close to the center of gravity of the vehicle 10. It will be appreciated that the center of gravity of the vehicle 10 may be located close to the seats 16. This configuration allows the occupants to experience a more comfortable ride while riding on rough terrain, as movement of parts of the vehicle 10 close to the center of gravity tend to be less than those remote from the center of gravity. Similarly, by locating the canister 30 close to the vehicle center of gravity, the canister 30 can be subjected to less movement and acceleration than would be typical if the canister 30 were positioned at a location further from the center of gravity of the vehicle 10. Thus, the function and durability of the canister 30 may be improved. In one embodiment, the canister 30 may be mounted in a location above the base members 14, behind the front upright members 20 and in front of the rear upright members 22. More specifically, the canister 30 may be mounted in the console 25. It will be understood that alternative embodiments may include the canister 30 mounted under or behind the seats 16.

In the present embodiment, the canister 30 may be positioned relatively close to the fuel tank 28 and the engine 24 to reduce the length of the first conduit 32 and the second conduit 34. Moreover, positioning the canister 30 in the occupant area 18, such as in the console 25 under the console cover 26, may protect the canister 30 from exposure to mud and water to reduce the wear on the canister 30.

In one embodiment, as depicted in FIGS. 3-7, a tubular frame member 40 may extend in a longitudinal direction between and in front of the pair of seats 16. The tubular frame member 40 may comprise one of the plurality of frame members 13 forming the vehicle frame 12. The tubular frame member 40 may be attached to other portions of the frame 12 that support or that are in the area of the seats 16, and may extend to portions of the frame 12 that support or are in the area of the dashboard 23. For example, the tubular frame member 40 may be attached to a cross frame member 41 that may be configured to support the seats 16. The tubular frame member 40 may also be attached at a forward end to a forward cross member 43 in front of the dashboard 23. The tubular frame member 40 may support the console cover 26 and may add strength to the cross frame member 41 and the forward cross member 43. The tubular frame member 40 may be sloped upwardly in a rear to front direction, and the canister 30 may be attached to the tubular frame member 40 through a bracket 42. The air intake conduit 36 for the canister 30 may also be attached to the tubular frame member 40 at a location higher than the canister 30. Increasing the height of the air intake conduit 36 may reduce the likelihood that water or other debris may be ingested into the canister 30.

In one embodiment, the air intake conduit 36 extends to a hollow interior of the tubular frame member 40 to draw intake air from the interior of the tubular frame member 40.

The tubular frame member 40 may include openings and/or the tubular frame member 40 may be connected to other portions of the frame 12 using joints and connections that allow air to pass into the interior of the tubular frame member 40. For example, an end of the tubular frame member 40 may be welded or otherwise attached to a side of the cross frame member 41 and the forward cross member 43. An opening in the side of the cross frame member 41 and/or the forward cross member 43 may be provided where the tubular frame member 40 is attached to allow the interior space of the cross frame member 41 and/or the forward cross member 43 to be in communication with an interior of the tubular frame member 40. Additional openings in the ends or the sides of the tubular frame member 40, cross frame member 41, forward cross member 43 or any other portions of the frame 12 may be provided to allow air to enter into the interior of the tubular frame member 40. Accordingly, the tubular frame member 40 may assist in filtering the intake air so as to reduce the likelihood that deleterious substances are ingested into the canister 30 through the air intake conduit 36. In some embodiments, a filter material may be placed in the interior of the tubular frame member 40 or the intake conduit 36 to further assist in filtering the intake air.

Figure 5:
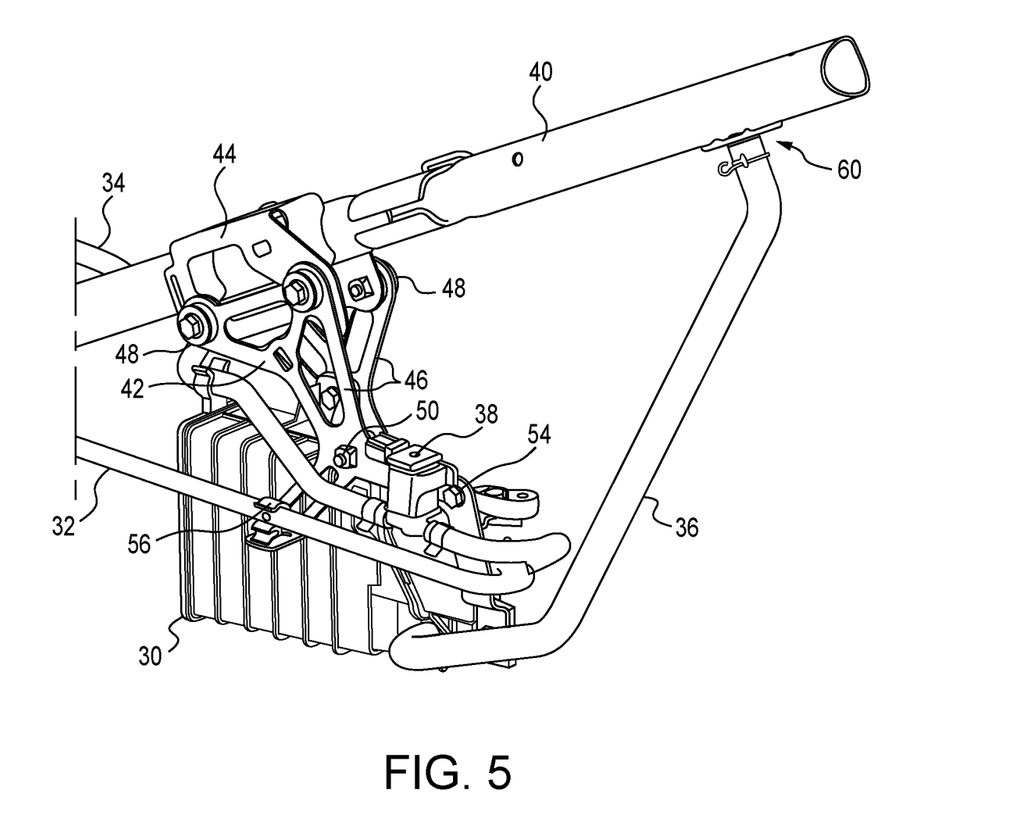
FIG. 5 is a perspective view of a canister mounted on a tubular frame member of a vehicle.
Figure 6:
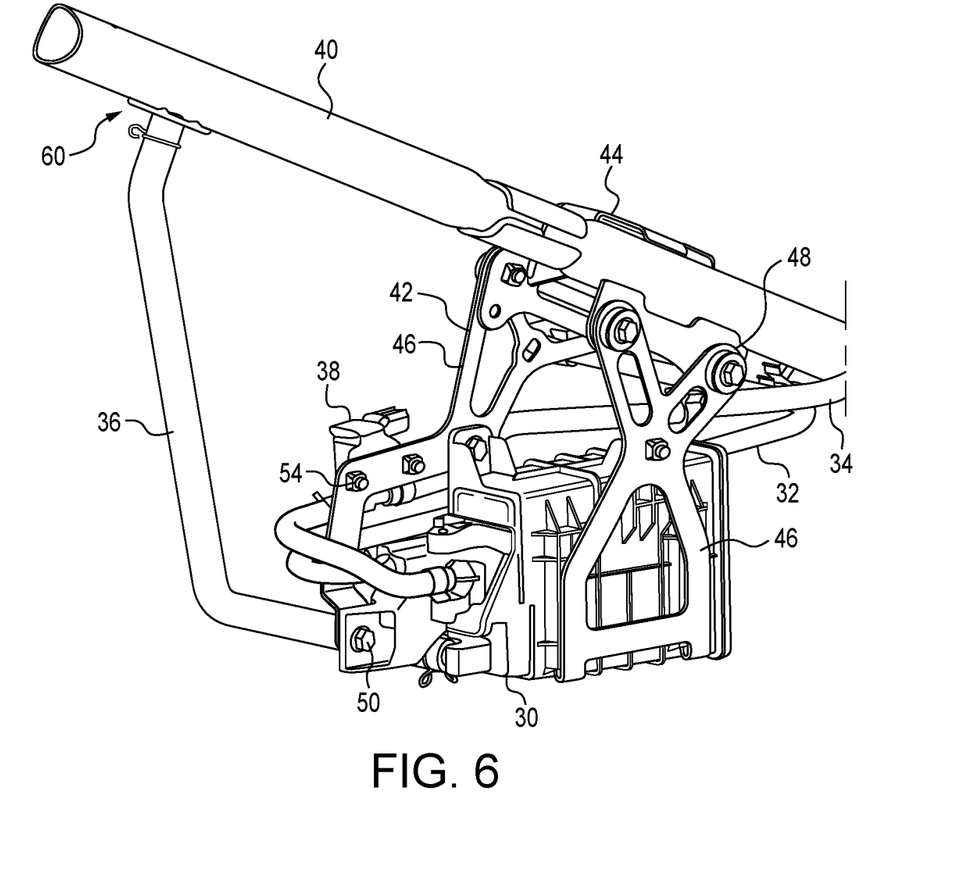
FIG. 6 is a perspective view of the canister of FIG. 5 showing the reverse side of the canister.
Figure 7:
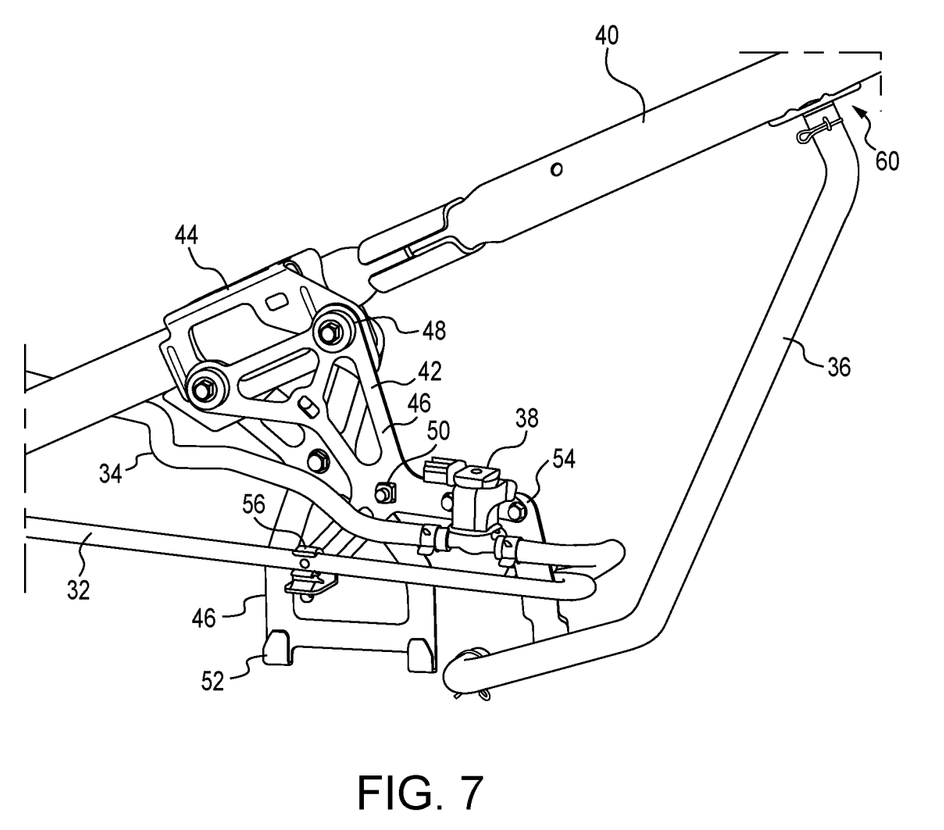
FIG. 7 is a perspective view of the tubular frame member and bracket of FIG. 5 with the canister removed to reveal additional details of the bracket.

With particular reference to FIGS. 5-7, the bracket 42 may be attached to the tubular frame member 40 using welding and/or fasteners. For example, the bracket 42 may include a fixing portion 44 that may be welded or otherwise attached to the tubular frame member 40 with fasteners including bolts, rivets, or the like. The bracket 42 may also include two canister portions 46. Each of the canister portions 46 may be attached to the fixing portion 44 using one or more vibration reduction devices, such as resilient members 48. The resilient members 48 may be formed as collars or grommets to include an opening for receiving a fastener to fasten the canister portions 46 to the fixing portion 44 of the bracket 42. The resilient members 48 may be formed of a resilient material, such as rubber, configured to absorb vibrations carried through the tubular frame member 40 such that the vibration on the canister 30 can be reduced. In one embodiment, four resilient members 48 may be used in attaching the bracket 42 to the tubular frame member 40. Two of the resilient members 48 may be positioned on one side of the bracket 42 as shown most clearly in FIG. 5, and two of the resilient members 48 may be positioned on an opposite side of the bracket 42 as shown most clearly in FIG. 6. It will be understood however, that other quantities of resilient members 48 may be used in accordance with the principles of the present disclosure.

Each of the canister portions 46 of the bracket 42 may also include provisions for attaching the canister 30, such as openings 50 for receiving fasteners. As shown most clearly in FIG. 7, one of the canister portions 46 of the bracket 42 may include a bottom support 52, such as a hook or ledge for extending underneath the canister 30 to support the canister 30 from beneath. Accordingly, the bracket 42 may be configured to support the canister 30 on three sides. It will be understood that alternative embodiments may include a one-piece bracket with a bridging portion for supporting the bottom of the canister 30, or other embodiments of the bracket may be configured to support the canister 30 from only one or two sides. Yet further embodiments of the bracket may be configured to support the canister 30 from four sides.

The bracket 42 may also include a purge valve mount 54 for mounting the purge valve 38 to the bracket 42. The purge valve mount 54 may include an area of the bracket 42 for coupling the purge valve 38 using attaching devices such as threaded fasteners, rivets, welds, adhesives, or the like. Accordingly, the purge valve 38 can be installed at a convenient location with respect to the canister 30 in a manner that facilitates manufacturing and installation of both the canister 30 and the purge valve 38.

The bracket 42 may also include one or more supports or clips 56 for attaching the conduits 32, 34, 36. For example, a clip 56 may be provided for receiving the first conduit 32 from the fuel tank 28 to hold the first conduit 32 with respect to the canister 30. It will be appreciated that the bracket 42 may include other clips for receiving the second conduit 34, the air intake conduit 36 or any other conduit or electrical wiring.

A discussion of a conduit mounting device, indicated generally at 60 in FIGS. 5-10 will now be provided. FIGS. 5-7 depict an exemplary embodiment of the placement of the conduit mounting device 60, whereas details of the conduit mounting device 60 are shown most clearly in FIG. 8, which shows a perspective view of the conduit mounting device 60 and a sectional view of an air intake conduit 36 and a tubular frame member 40.

Figure 8:
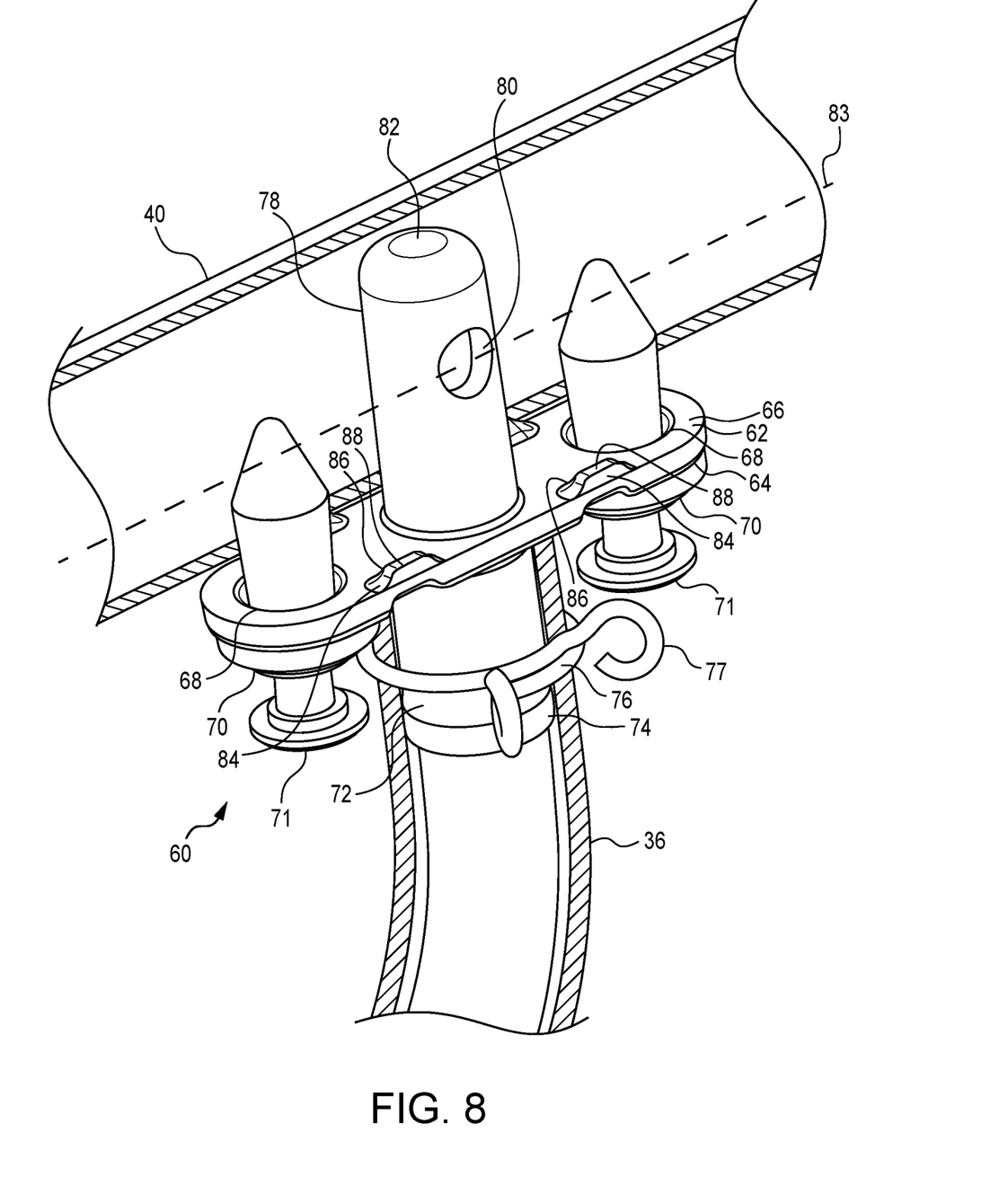
FIG. 8 is a perspective view of a conduit mounting device and a sectional view of an air intake conduit and tubular frame member.
Figure 9:
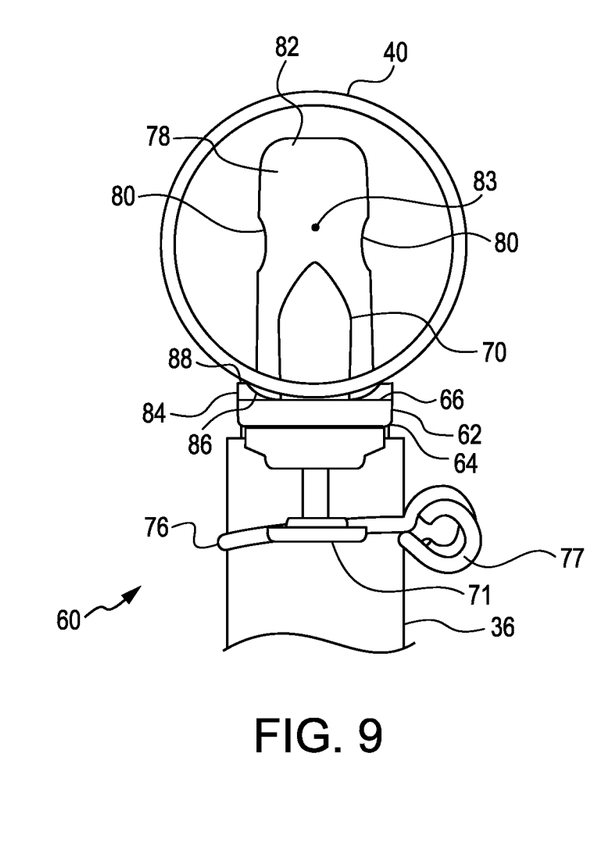
FIG. 9 is an end view of the conduit mounting device and tubular frame member of FIG. 8.

The conduit mounting device 60 may include a base 62 having a first side 64 and an opposing second side 66. The base 62 may include a pair of fastener openings 68 for receiving fasteners 70 to attach the base 62 to the frame member 40. The fasteners 70 may be formed as any suitable fastening device known to those skilled in the art, such as snap-in fasteners, screws, rivets, or the like. One embodiment of the fasteners 70 may include snap-in fasteners, sometimes referred to as plastic rivets or push-pin fasteners. Such fasteners 70 may include a push pin 71 that may be pressed to cause the fastener 70 to expand once the fastener 70 is installed through the fastener opening 68 to hold the fastener 70 in place. Accordingly, the fastener 70 may be installed quickly and easily without the need for tools or other installation equipment.

The conduit mounting device 60 may also include a connector 72 extending from the first side 64 of the base 62 between the pair of fastener openings 68. The connector 72 may be configured as a tubular member having a diameter such that the air intake conduit 36 may be placed around an exterior of the connector 72. The connector 72 may include one or more ribs 74 to facilitate holding the conduit 36 on the connector 72. It will be understood that the conduit 36 may be configured to elastically stretch to receive the connector 72 in an interior of the conduit 36 to form a fluid tight connection. A clip 76 may also be provided to more securely attach the conduit 36 to the connector 72. The clip 76 may be formed as a resilient loop with handles 77 that can be pinched together to allow the clip 76 to expand to receive the conduit 36 within the loop. It will be understood that the clip may be formed in various other suitable configurations within the scope of the present disclosure, and that some embodiments of the conduit mounting device 60 may not utilize the clip 76.

The conduit mounting device 60 may also include a pipe 78 extending from the second side 66 of the base 62. The pipe 78 may include an inlet 80 and form a passage for allowing intake air to pass through the pipe 78, the connector 72 and the conduit 36 to the canister 30. In one embodiment, the pipe 78 may include a cap 82 on an end of the pipe 78. The cap 82 may be formed integrally with the pipe 78, or the cap 82 may be formed as a covering over the end of the pipe 78 such that the end of the pipe 78 may be protected to prevent unwanted material from entering the pipe 78. The inlet 80 may be formed in the side of the pipe 78. This configuration allows for intake air to be drawn into the conduit mounting device 60 from inside the frame member 40 to reduce the amount of dust and moisture ingested into the canister 30. The air intake may be positioned approximately at a centerline 83 of the frame member 40, which may further prevent moisture from moving along the interior sidewall of the frame member 40 into the intake. Moreover, the cap 82 may be configured to shield the air inlet 80 from corrosion or other debris inside the frame member 40 from falling into the pipe 78.

The conduit mounting device 60 may also include a plurality of supports 84 projecting from the second side 66 of the base 62 for supporting the conduit mounting device 60 against the frame member 40. The supports 84 may be spaced apart to receive a frame member 40 having a rounded surface between the supports 84, as shown most clearly in FIG. 9. Accordingly, supports 84 may contact the frame member 40 on opposite sides of the centerline 83 extending along the frame member 40. The supports 84 may have a side wall 86 that contacts an exterior surface of the frame member 40 to hold the frame member 40 in position. One embodiment of the supports 84 includes interior side walls 86 that are sloped so that contact with the frame member 40 provides support to the frame member 40 in an upward and lateral direction. Moreover, referring back to FIG. 8, one embodiment of the conduit mounting device 60 may include four supports 84 that may be configured to prevent rotation of the conduit mounting device 60 about the pipe 78 with respect to the frame member 40 prior to attachment of the fasteners 70. Two of the supports 84 may be positioned between each of the fastener openings 68 and the pipe 78 along a length of the base 62.

Figure 10:
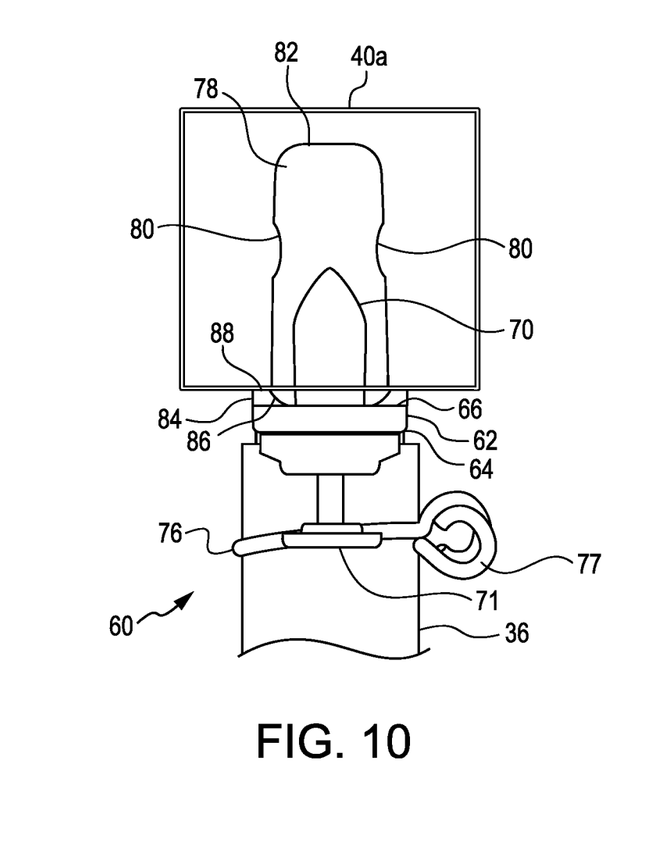
FIG. 10 is an end view of a conduit mounting device on an alternative embodiment frame member.

The supports 84 may also include an upper surface 88 that may form a planar surface for contacting a frame member 40a having a corresponding planar surface, as shown most clearly in FIG. 10. FIG. 10 depicts an end view of the conduit mounting device 60 on an alternative embodiment frame member 40a with a square cross-sectional shape. The conduit mounting device 60 may contact the frame member 40a at multiple points to remain stable when the frame member has a flat surface. Thus the conduit mounting device 60 may be versatile for use with differently configured frame members, including rounded tubular members and frame members with flat surfaces, such as frame members with square or rectangular cross-sections.

One embodiment of the conduit mounting device 60 may be constructed using a plastic material in an injection molding process. However, it will be appreciated that any other suitable method and material known to those skilled in the art may be used to construct the conduit mounting device 60 within the scope of the present disclosure.

It will be appreciated that the conduit mounting device 60 can be easily installed by forming openings in the frame member 40, inserting the pipe 78 into one of the openings and inserting the fasteners 70 into the other openings and through the fastener openings 68 in the base 62. The push pins 71 may be pressed to fix the fasteners 70 in position in the frame member 40 and the base 62. The conduit 36 may be installed over the connector 72, and the clip 76 may be installed around the conduit 36 and the connector 72 to further hold the conduit 36 on the connector 72. Accordingly, assembly of the air intake conduit 36 and the conduit mounting device 60 on the frame member 40 can be accomplished quickly and without the need for tools. Moreover, no additional components, brackets or weldments are required on the host frame member 40.

It will be understood that the conduit mounting device 60 described above can mount conduits 36 of evaporative emissions control equipment in a manner that allows for intake air to be withdrawn from a location that reduces ingestion of water or dirt, such as an interior of a frame member 40. Additionally, the conduit mounting device 60 can be mounted easily to frames having different configurations.

It will also be understood that the vehicle canister mounting arrangement described above can be easily accessed to facilitate installation and maintenance of the canister 30. The arrangement also provides for protection of the canister 30 from harsh off-road elements including water, mud and dirt, to improve the durability of the canister 30. Moreover, the present arrangement allows for improved operation and durability of the canister 30 due to reduced accelerations and vibrations applied to the canister 30.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A conduit mounting device comprising:
   a base having a first side and an opposing second side, the base comprising a pair of fastener openings for receiving fasteners to attach the base to a tubular frame of a vehicle;
   a plurality of supports projecting from the second side of the base for supporting the conduit mounting device against the frame;
   a connector extending from the first side of the base between the pair of fastener openings for connecting to a conduit; and
   a pipe extending away from the second side of the base in a longitudinal direction and terminating in an end, wherein a cap is disposed on the end, the cap completely enclosing the end of the pipe, the pipe having an inlet and forming a passage from the connector to the inlet;
   wherein the second side of the base defines a planar surface, and the pair of fastener openings are defined through the planar surface so as to be coplanar.

2. The conduit mounting device of claim 1 wherein the inlet is positioned on a side of the pipe transverse to the longitudinal direction between the base and the end.

3. The conduit mounting device of claim 1 wherein the supports are spaced apart to receive a frame member having a rounded surface, and wherein the supports are further configured to define a planar surface for contacting a frame member having a corresponding planar surface.

4. The conduit mounting device of claim 3 wherein the supports have a sloped side wall.

5. The conduit mounting device of claim 3 wherein the supports have a planar upper surface.

6. The conduit mounting device of claim 1 wherein the mounting device is formed of a plastic material, and the cap is formed integrally with the pipe.

7. The conduit mounting device of claim 1 further comprising snap-in fasteners for attaching the base to the frame.

8. A conduit mounting device comprising:
a base having a first side and an opposing second side, the second side being planar, the base comprising at least one fastener opening for receiving a fastener to attach the base to a frame;
a connector extending from the first side of the base for connecting to a conduit;
a pipe extending from the second side of the base, the pipe having an inlet; and
a plurality of supports projecting from the second side of the base, the supports being spaced apart to receive a frame member having a rounded surface, the supports further configured to define a planar surface for contacting a frame member having a corresponding planar surface;
wherein the plurality of supports comprise interior side walls, the interior side walls extend directly from the planar second side of the base at a slope such that when the frame member contacts the planar second side of the base and the interior side walls, the interior side walls provide support to the frame member in an upward and lateral direction.

9. The conduit mounting device of claim 8 wherein the base comprises two fastener openings, and wherein the connector is positioned between the two fastener openings.

10. The conduit mounting device of claim 9 wherein the plurality of supports comprises four supports, and wherein two of the supports are positioned between each of the fastener openings and the pipe along a length of the base.

11. The conduit mounting device of claim 8 further comprising a cap on an end of the pipe, the cap completely enclosing the end of the pipe.

12. The conduit mounting device of claim 11 wherein the inlet is positioned on a side of the pipe between the cap and the base.

13. The conduit mounting device of claim 8 wherein the supports have a planar upper surface.

14. A conduit mounting device mounting a conduit of a vapor canister on a vehicle having a frame comprised of a plurality of tubular members supporting an engine and a pair of seats, the conduit mounting device comprising:
a base having a first side and an opposing second side;
a connector extending from the first side of the base connecting to the conduit such that the conduit extends from the connector to the vapor canister;
a pipe extending from the second side of the base, the pipe extending into one of the plurality of tubular frame members, the pipe having an inlet; and
a fastener fastening the device to the one of the plurality of tubular frame members;
wherein the pair of seats are arranged in a side-by-side configuration, and wherein the one of the plurality of tubular frame members is located in an area between and in front of the seats, the canister and the conduit mounting device both being attached to the one of the plurality of tubular frame members in the area between and in front of the seats.

15. The conduit mounting device of claim 14 wherein the pipe extends away from the second side of the base in a longitudinal direction and terminates at an end, wherein a cap is disposed on the end, the cap completely enclosing the end of the pipe.

16. The conduit mounting device of claim 14 wherein the one of the plurality of tubular frame members is sloped upwardly in a rear to front direction, and the conduit mounting device is attached to the one of the plurality of tubular frame members at a location higher than the canister.

17. The conduit mounting device of claim 15 wherein the inlet is positioned on a side of the pipe transverse to the longitudinal direction between the base and the end, and wherein the inlet is positioned approximately at a centerline of the one of the plurality of tubular frame members.

18. The conduit mounting device of claim 1 wherein the supports are spaced apart in a lateral direction of the base to receive a frame member having a rounded surface there between, wherein the plurality of supports comprise interior side walls, the interior side walls extend directly from the planar second side of the base at a slope such that when the frame member contacts the planar second side of the base and the interior side walls, the interior side walls provide support to the frame member in an upward and lateral direction, wherein the supports have a planar upper surface to define a planar surface for contacting a frame member having a corresponding planar surface;
wherein the pipe is positioned between the pair of fastener openings;
wherein the plurality of supports comprises four supports, and wherein two of the supports are positioned between each of the fastener openings and the pipe along a length of the base to prevent rotation of the conduit mounting device about the pipe with respect to the frame member;
wherein the inlet is positioned on a side of the pipe transverse to the longitudinal direction between the base and the cap;
wherein the conduit mounting device is formed of plastic, and the cap is formed integrally with the pipe.

19. The conduit mounting device of claim 4 wherein the plurality of supports comprise interior side walls, the interior side walls extending directly from the planar second side of the base at a slope such that when the frame member contacts the planar second side of the base and the interior side walls, the interior side walls provide support to the frame member in an upward and lateral direction.

20. The conduit mounting device of claim 1 wherein the connector comprises a rib for holding the conduit on the connector, and a clip for attaching the conduit to the connector.

* * * * *